Aug. 12, 1947. A. DUTOIT 2,425,520
ELECTRIC ABRASIVE PROJECTOR
Filed June 1, 1945

Inventor:
André Dutoit,
By Pierce & Scheffler,
Attorneys.

Patented Aug. 12, 1947

2,425,520

UNITED STATES PATENT OFFICE 2,425,520

ELECTRIC ABRASIVE PROJECTOR

André Dutoit, Le Locle, Switzerland, assignor to Aktiengesellschaft Brown, Boveri & Cie, Baden, Switzerland Application June 1, 1945, Serial No. 597,043
In Switzerland June 17, 1944

9 Claims. (Cl. 51—9)

For the removal of moulding sand from castings, devices can be used in which a blast of steel particles or shot at high velocity is produced by means of field coils spaced along a discharge tube of metal or non-metallic material through which the shot travels. The field coils are excited either by direct current, or a commutator device may be used for impressing direct current impulses on the coils, or the coils may be connected in groups of three to a three-phase alternating current network, so that progressively moving magnetic fields occur along the axis of the tube through which the particles move. The steel particles, which are preferably introduced into the tube with a certain initial velocity, upon approaching the coils or groups of coils pass into the magnetic field produced by these coils and are accelerated by it. When the particles traverse the point of maximum field strength of the coils care must be taken that the field of the coil disappears because otherwise reverse forces would retard the accelerated particles and reduce their speed down to the starting velocity. With such a device it is, however, necessary that the switching times for the field coils should be made to agree exactly with the prevailing velocity of the accelerated shot packets. If for instance the next coil or group of coils is switched in too late the shot packet sticks in the tube, whilst if the coil is switched out too early then the shot packet has not yet reached the maximum field and does not attain its maximum speed.

The present invention concerns a device for producing a blast of iron particles at high speed, particularly for casting cleaning machines, by means of field coils spaced along the path of the blast for controlling the acceleration of the particles, where according to the invention means are provided which in dependence on the passage of the moving particles through the point of maximum field strength of the coils control the excitation of said coils.

Figure 1:
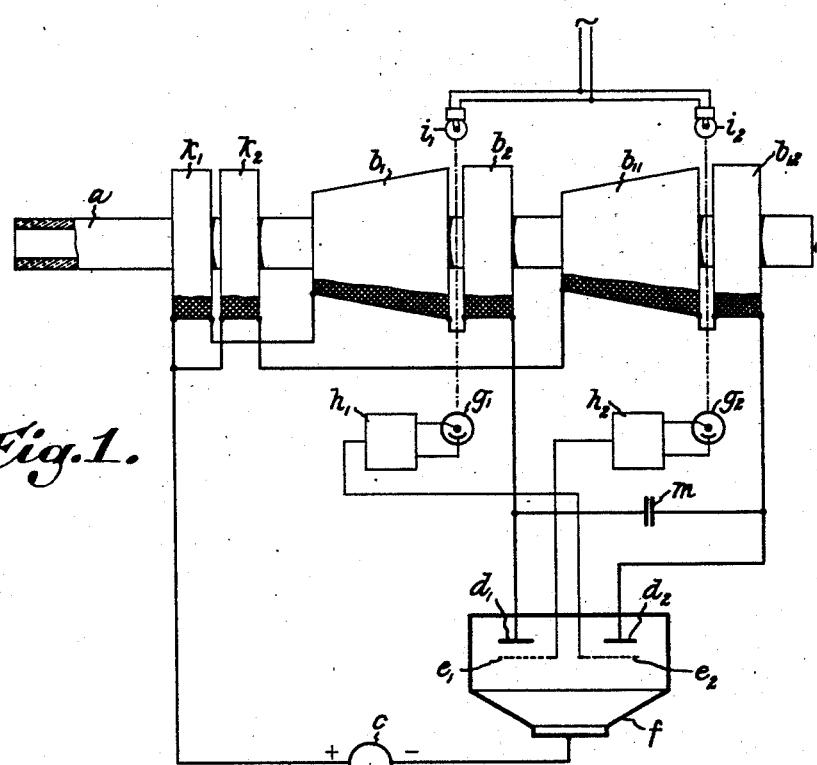
Figure 2:
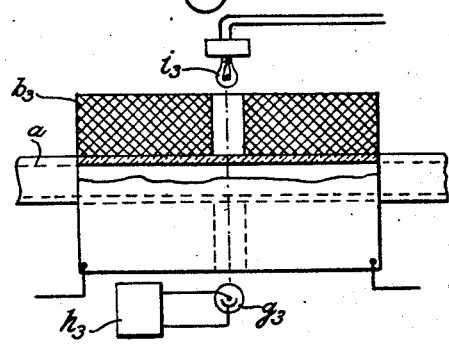

In the accompanying drawings, Fig. 1 is a somewhat diagrammatic view illustrating one constructional example of an electric abrasive projector embodying the invention, while Fig. 2 shows an alternative construction for the accelerating coils shown in Fig. 1.

The device in Fig. 1 consists mainly of a tube $a$ made of glass through which the iron particles which are used for cleaning the castings pass. The iron particles enter from the left with an initial velocity and leave the tube at the other end with an increased speed. The acceleration points for the iron particles consist of the field coils $b_1$, $b_2$, $b_{11}$, $b_{12}$ which are excited with direct current from the source $c$. The coils $b_1$, $b_2$ and $b_{11}$, $b_{12}$ are connected together in series and to the anode circuit of the rectifier $f$. The anodes $d_1$, $d_2$ of the rectifier are provided with control grids $e_1$, $e_2$. Each acceleration point formed by the coils $b_1$, $b_2$ and $b_{11}$, $b_{12}$ has a device for controlling the excitation of the field coils associated with it, this device consisting of a photo-electric cell $g_1$, $g_2$, a source of light $i_1$, $i_2$ and a device $h_1$, $h_2$ for influencing the control grids of the rectifier $f$ in dependence on the passage of the iron particles through the coils. The photo-electric cells and light sources are located at that point of the acceleration coils where the maximum field strength occurs and their mutual position relative to the accelerated particles is such that the source of light is screened off by the iron particles. The excitation of the acceleration coils spaced along the tube axis occurs alternately by means of the photo-electric cells associated with these acceleration points. Photo-electric cell $g_1$ controls the excitation of coils $b_{11}$, $b_{12}$ and cell $g_2$ that of coils $b_1$, $b_2$. At the inlet end of the tube $a$ there are the field coils $k_1$, $k_2$ which are connected in series with the coils $b_1$, $b_2$ and $b_{11}$, $b_{12}$ and are excited in step with these coils in such a manner that the iron particles approach the acceleration coils in packets or bunches.

The method of operation of this device is as follows:

Considering the instant when a packet of iron particles just passes through the maximum field of the acceleration point formed by the coils $b_1$, $b_2$, that is to say when the packet is passed on to the next acceleration point, then due to the light source $i_1$ being screened by the iron particles the photo-electric cell $g_1$ will excite the grid control device $h_1$ so that the arc between the anode $d_2$ and the cathode of the rectifier $f$ is ignited. The direct-current supply $c$ is thus switched over from the coils $b_1$, $b_2$ to the acceleration coils $b_{11}$, $b_{12}$. The excitation of coil $k_1$ is interrupted at the same time and coil $k_2$ is now excited. The packet of iron particles leaving the acceleration point $b_1$, $b_2$ is then attracted into the field of the exciter coils $b_{11}$, $b_{12}$ where it is again accelerated. At the same time a fresh packet of iron particles is attracted by the field coil $k_2$ from the supply of particles in the tube. If the packet of iron particles moving through the field of coils $b_{11}$, $b_{12}$ has reached the point of maximum field strength then the anode $d_1$ of rectifier $f$ is ignited by means of the photo-electric cell $g_2$ and the grid control device $h_2$, whereupon coils $k_1$, $b_1$, $b_2$ are excited whilst coils $k_2$, $b_{11}$, $b_{12}$ have their excitation interrupted. The packet of iron particles formed in the coil $k_2$ is attracted by the field of the coils $b_1$, $b_2$ whilst the packet inside the coils $b_{11}$, $b_{12}$ is expelled from the tube $a$ with maximum velocity. This cycle of operations repeats itself periodically. When the excitation of the acceleration coils changes the arc which burns between one of the anodes and the cathode of the rectifier is extinguished by the condenser $m$.

Instead of using two field coils of different shape for each acceleration point one single coil $b_3$ as shown in Fig. 2 can be employed which is provided with a bore perpendicular to the coil axis for instance half way along the coil, a photo-electric cell $g_3$ being located at one end of this bore and a source of light $i_3$ at the other. As in the Fig. 1 construction, the grid control device $h_3$ is excited by the photo-cell $g_3$ as a packet of particles screens the photo-cell from the light source $i_3$ to thereby ignite the arc between the cathode and anode of the rectifier.

I claim:

1. In an electromagnetic abrasive projector for projecting a blast of magnetizable particles, a tube constituting a path for said particles, bunching coil means surrounding said tube at the inlet portion, a plurality of accelerating coils spaced along and surrounding said tube, a power source, and means periodically energizing said bunching coil means from said power source to form said particles into packets in timed relation with periodic energization of said accelerating coils in sequence to produce a magnetic field traveling lengthwise along said tube for accelerating said particle packets, last said means including a control device associated with each said accelerating coil and responsive upon passage of a particle packet therethrough to effect energization of an adjacent accelerating coil.

2. In an electromagnetic abrasive projector for projecting a blast of magnetizable particles, a tube constituting a path for said particles, bunching coil means surrounding said tube at the inlet portion, a pair of accelerating coils spaced along and surrounding said tube, a power source, and means periodically energizing said bunching coil means from said power source to form said particles into packets in timed relation with periodic and alternate energization of said accelerating coils to produce a magnetic field traveling lengthwise along said tube for accelerating said particle packets therethrough, last said means including a control device associated with each said accelerating coil which is responsive upon passage of a particle packet therethrough and which is connected into the control for an adjacent accelerating coil.

3. In an electromagnetic abrasive projector for projecting a blast of magnetizable particles, a tube, a pair of bunching coils spaced axially along said tube, a pair of accelerating coils spaced axially from said bunching coils and along said tube, a power source, a pair of energizing circuits each including one bunching coil and one accelerating coil, and means responsive to the passage of magnetizable particles through one of said accelerating coils for completing the energizing circuit of the other accelerating coil and its circuit associated bunching coil.

4. In an electromagnetic abrasive projector for projecting a blast of magnetizable particles, a tube, a pair of bunching coils disposed at the inlet portion of said tube, a pair of accelerating coils spaced along said tube for accelerating said particles, a power source, circuit means connecting one of said bunching coils and one of said accelerating coils to said power source, circuit means connecting the other said bunching coil and accelerating coil to said power source, a switching device in each said circuit means, and means responsive to the passage of said particles through one of said accelerating coils for controlling the said switching device in the circuit means which includes the other accelerating coil.

5. In an electromagnetic abrasive projector for projecting a blast of magnetizable particles, a tube, a pair of bunching coils disposed at the inlet portion of said tube, a pair of accelerating coils spaced along said tube for accelerating said particles, each said accelerating coil having a passageway extending therethrough at substantially the point of maximum field strength, a power source, circuit means connecting one of said bunching coils and one of said accelerating coils to said power source, circuit means connecting the other said bunching coil and accelerating coil to said power source, a switching device in each said circuit means, and control means responsive to the travel of said particles across the passageway through one of said accelerating coils for controlling the said switching device in the said circuit means which includes the other accelerating coil.

6. The combination in claim 5 characterized by the feature that each said accelerating coil comprises two windings slightly spaced axially to provide said passageway.

7. The combination in claim 5 characterized by the feature that each said accelerating coil comprises a single winding having a transverse bore therethrough constituting said passageway.

8. The combination in claim 5 characterized by the features that said tube is light conductive at said passageway and that said control means comprises a photoelectric cell at one end of said passageway and a source of light at the other end thereof.

9. The combination in claim 5 characterized by the features that said switching devices are grid controlled valves, said power source, accelerating and bunching coils being connected in the respective anode-cathode circuits thereof and the said control means being connected in the respective grid circuits thereof.

ANDRÉ DUTOIT.

REFERENCES CITED

The following references are of record in the file of this patent:

UNITED STATES PATENTS

| Number | Name | Date |
|---|---|---|
| 2,224,505 | Unger | Dec. 10, 1940 |
| 2,235,201 | Cole | Mar. 18, 1941 |

FOREIGN PATENTS

| Number | Country | Date |
|---|---|---|
| 809,872 | France | Dec. 19, 1936 |